(12) United States Patent
Gou et al.

(10) Patent No.: US 12,549,316 B2
(45) Date of Patent: Feb. 10, 2026

(54) METHODS AND DEVICES FOR ALLOCATING UPLINK RESOURCE FOR MBMS UPLINK FEEDBACK INFORMATION

(71) Applicant: ZTE Corporation, Shenzhen (CN)

(72) Inventors: Wei Gou, Shenzhen (CN); Peng Hao, Shenzhen (CN); Chenchen Zhang, Shenzhen (CN); Wei Chen, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 382 days.

(21) Appl. No.: 17/989,828

(22) Filed: Nov. 18, 2022

(65) Prior Publication Data
US 2023/0082646 A1    Mar. 16, 2023

Related U.S. Application Data (63) Continuation of application No. PCT/CN2020/091304, filed on May 20, 2020.

(51) Int. Cl.
*H04L 5/00* (2006.01)
*H04W 72/30* (2023.01)

(52) U.S. Cl.
CPC ........... *H04L 5/0055* (2013.01); *H04W 72/30* (2023.01)

(58) Field of Classification Search
CPC .............................. H04L 5/0055; H04W 72/30
USPC ........................................................ 370/329
See application file for complete search history.

(56) References Cited

U.S. PATENT DOCUMENTS

| | | | |
|---|---|---|---|
| 2012/0224577 A1 | 9/2012 | Gou et al. | |
| 2015/0230228 A1* | 8/2015 | Zhang | H04L 12/189 370/329 |
| 2017/0295005 A1* | 10/2017 | Lee | H04L 5/0053 |
| 2017/0310447 A1* | 10/2017 | Kusashima | H04L 1/1861 |
| 2018/0115430 A1* | 4/2018 | Seo | H04L 1/1854 |
| 2018/0234808 A1* | 8/2018 | Adachi | H04W 72/0453 |
| 2019/0123923 A1 | 4/2019 | Belleschi et al. | |
| 2019/0281621 A1* | 9/2019 | Noh | H04L 1/1896 |
| 2022/0217507 A1* | 7/2022 | Wang | H04W 4/06 |

(Continued)

FOREIGN PATENT DOCUMENTS

| | | |
|---|---|---|
| CN | 1891003 A | 1/2007 |
| CN | 102047699 A | 5/2011 |
| CN | 102264038 A | 11/2011 |

(Continued)

OTHER PUBLICATIONS

Australian Examination Report No. 2 regarding JP 2020397131 dated Feb. 1, 2024, 3 pages.

(Continued)

*Primary Examiner* — Faisal Choudhury
(74) *Attorney, Agent, or Firm* — Crowell & Moring LLP (57) ABSTRACT

The present disclosure describes methods, system, and devices for allocating uplink resource for multimedia broadcast multicast (MBMS) uplink feedback information. The method includes sending, by a radio access network (RAN) to at least one user equipment (UE), at least one multicast traffic channel (MTCH) transmission in a MBMS service. The method also includes allocating, by the RAN for the at least one UE, at least one resource for transmitting MBMS-related uplink feedback information corresponding to the at least one MTCH transmission.

16 Claims, 9 Drawing Sheets

(56) References Cited

U.S. PATENT DOCUMENTS

| | | | | |
|---|---|---|---|---|
| 2022/0264613 A1* | 8/2022 | Xu | ........................ | H04L 5/0053 |
| 2022/0278804 A1* | 9/2022 | Wang | .................... | H04L 5/0051 |

FOREIGN PATENT DOCUMENTS

| | | | |
|---|---|---|---|
| CN | 102300159 | A | 12/2011 |
| CN | 102378113 | A | 3/2012 |
| CN | 107135486 | A | 9/2017 |
| CN | 107734606 | A | 2/2018 |
| EP | 2490466 | A1 | 8/2012 |
| JP | 2009-542084 | | 11/2009 |
| JP | 2010-531100 | | 9/2010 |
| WO | WO 2007/148934 | A1 | 12/2007 |
| WO | WO 2008156302 | A1 | 12/2008 |
| WO | WO 2011/147239 | A1 | 12/2011 |
| WO | WO 2013/095355 | A1 | 6/2013 |
| WO | WO 2017/171616 | A1 | 10/2017 |
| WO | WO 2018/028497 | A1 | 2/2018 |
| WO | WO 2019/191939 | A1 | 10/2019 |
| WO | WO 2020/016940 | A1 | 1/2020 |

OTHER PUBLICATIONS

Notice of Reasons for Rejection for Japanese Patent Application No. 2022-570312, mailing date Mar. 18, 2024, 8 pages, including English Translation.

Notice of Final Rejection for Japanese Patent Application No. 2022-570312, mailing date Jul. 4, 2024, 10 pages, including English Translations.

Extended European Search Report regarding EP 20 89 7157 dated Apr. 5, 2023, 11 pages.

Japanese Office Action and English translation regarding JP 2022-570312 dated Nov. 14, 2023, 8 pages.

ZTE, "Uplink Feedback Approaches for MBMS," 3GPP TSG-RAN WG2 #70bis R2-103731, Jun. 22, 2010, 3 pages.

ETRI, "Design of HARQ feedback channel for MBMS," 3GPP TSG-RAN WG2#56bis R2-070111, Jan. 12, 2007, 4 pages.

International Search Report and Written Opinion regarding PCT/CN2020/091304 dated Jan. 27, 2021.

Australian Examination Report No. 1 regarding 2020397131 dated Jul. 26, 2023, 3 pages.

Chinese-language Office Action issued in Chinese Application No. 202080101202.9 dated Jul. 16, 2025 (6 pages).

Notice of Allowance dated Dec. 8, 2025 for Japanese Patent Application No. 2024-193013, with English translation (4 pages).

\* cited by examiner

┌─────────────────────────────────────────────────────────────────┐
│ sending, by a radio access network (RAN) to at least one user equipment (UE), at │
│ least one multicast traffic channel (MTCH) transmission in a MBMS service; │
│                                                              410 │
└─────────────────────────────────────────────────────────────────┘
                                   │
                                   ▼
┌─────────────────────────────────────────────────────────────────┐
│ allocating, by the RAN for the at least one UE, at least one resource for transmitting │
│ MBMS-related uplink feedback information corresponding to the at least one MTCH │
│ transmission                                                 420 │
└─────────────────────────────────────────────────────────────────┘

FIG. 4

```
┌─────────────────────────────────────────────────────────────────┐
│ for each UE of the at least one UE and each MTCH transmission  │
│ of the at least one MTCH transmission, using, by the each UE,  │
│ a physical uplink shared channel (PUSCH) for a unicast service │
│ for transmitting MBMS-related uplink feedback information       │
│ corresponding to the each MTCH transmission;                    │
│                                                           510   │
└─────────────────────────────────────────────────────────────────┘
                                │
                                ▼
┌─────────────────────────────────────────────────────────────────┐
│ generating, by the each UE, a medium access control (MAC)       │
│ control element (CE), based on the MBMS-related uplink          │
│ feedback information corresponding to the each MTCH             │
│ transmission;                                             520   │
└─────────────────────────────────────────────────────────────────┘
                                │
                                ▼
┌─────────────────────────────────────────────────────────────────┐
│ transmitting, by the each UE, the MAC CE via the PUSCH for      │
│ the unicast service to RAN                                      │
│                                                           530   │
└─────────────────────────────────────────────────────────────────┘
```

FIG. 5

600 receiving, by a user equipment (UE), configuration information for a feedback window corresponding to a multicast traffic channel (MTCH) transmission in a MBMS service from a radio access network (RAN);
610 determining, by the UE, a resource unit in the feedback window for transmitting MBMS-related uplink feedback information corresponding to the MTCH transmission
620

METHODS AND DEVICES FOR ALLOCATING UPLINK RESOURCE FOR MBMS UPLINK FEEDBACK INFORMATION

CROSS-REFERENCE TO RELATED APPLICATION

This application is a continuation application of PCT International Patent Application No. PCT/CN2020/091304, filed with the China National Intellectual Property Administration, PRC on May 20, 2020, which is herein incorporated by reference in its entirety.

TECHNICAL FIELD

The present disclosure is directed generally to wireless communications. Particularly, the present disclosure relates to methods and devices for allocating uplink resource for multimedia broadcast multicast (MBMS) uplink feedback information.

BACKGROUND

Wireless communication technologies are moving the world toward an increasingly connected and networked society. High-speed and low-latency wireless communications rely on efficient network resource management and allocation between user equipment (UE) and wireless access network nodes, including but not limited to radio access network (RAN). The RAN may communicate with one or more UE in a multimedia broadcast multicast (MBMS) service. The present disclosure may address the issues and/or problems in allocating uplink resource for MBMS uplink feedback information.

SUMMARY

This document relates to methods, systems, and devices for wireless communication, and more specifically, for allocating uplink resource for multimedia broadcast multicast (MBMS) uplink feedback information.

In one embodiment, the present disclosure describes a method for wireless communication. The method includes allocating uplink resource for multimedia broadcast multicast (MBMS) uplink feedback information by sending, by a radio access network (RAN) to at least one user equipment (UE), at least one multicast traffic channel (MTCH) transmission in a MBMS service; and allocating, by the RAN for the at least one UE, at least one resource for transmitting MBMS-related uplink feedback information corresponding to the at least one MTCH transmission.

In another embodiment, the present disclosure describes a method for wireless communication. The method includes allocating uplink resource for multimedia broadcast multicast (MBMS) uplink feedback information by receiving, by a user equipment (UE), configuration information for a feedback window corresponding to a multicast traffic channel (MTCH) transmission in a MBMS service from a radio access network (RAN); and determining, by the UE, a resource unit in the feedback window for transmitting MBMS-related uplink feedback information corresponding to the MTCH transmission.

In another embodiment, the present disclosure describes a method for wireless communication. The method includes allocating uplink resource for uplink feedback information related to physical downlink control channel (PDCCH) and for multimedia broadcast multicast (MBMS) uplink feedback information by respectively allocating, by a radio access network (RAN) for the user equipment (UE), an uplink feedback channel resource corresponding to a PDCCH scheduling a physical downlink shared channel (PDSCH), the uplink feedback channel resource being shared by at least one UE receiving the PDCCH sent from the RAN; allocating, by the RAN for the UE, an uplink feedback channel resource corresponding to the PDSCH carrying multicast traffic channel (MTCH) transmission data, the uplink feedback channel resource being shared by at least one UE receiving the PDSCH sent from the RAN; and transmitting, by the UE, uplink feedback information on the uplink feedback channel resource according to a preset rule.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for allocating uplink resource for multimedia broadcast multicast (MBMS) uplink feedback information.

Next generation (NG), or 5th generation (5G), wireless communication may provide a range of capabilities from downloading with fast speeds to support real-time low-latency communication. The wireless communication may have a multimedia broadcast multicast (MBMS) service. A radio access network (RAN), for example, a wireless base station, may transmit same data to multiple UE simultaneously. In some case, multiple base stations can transmit the same data simultaneously so that a particular UE may receive the same data from multiple base stations.

Figure 1A:
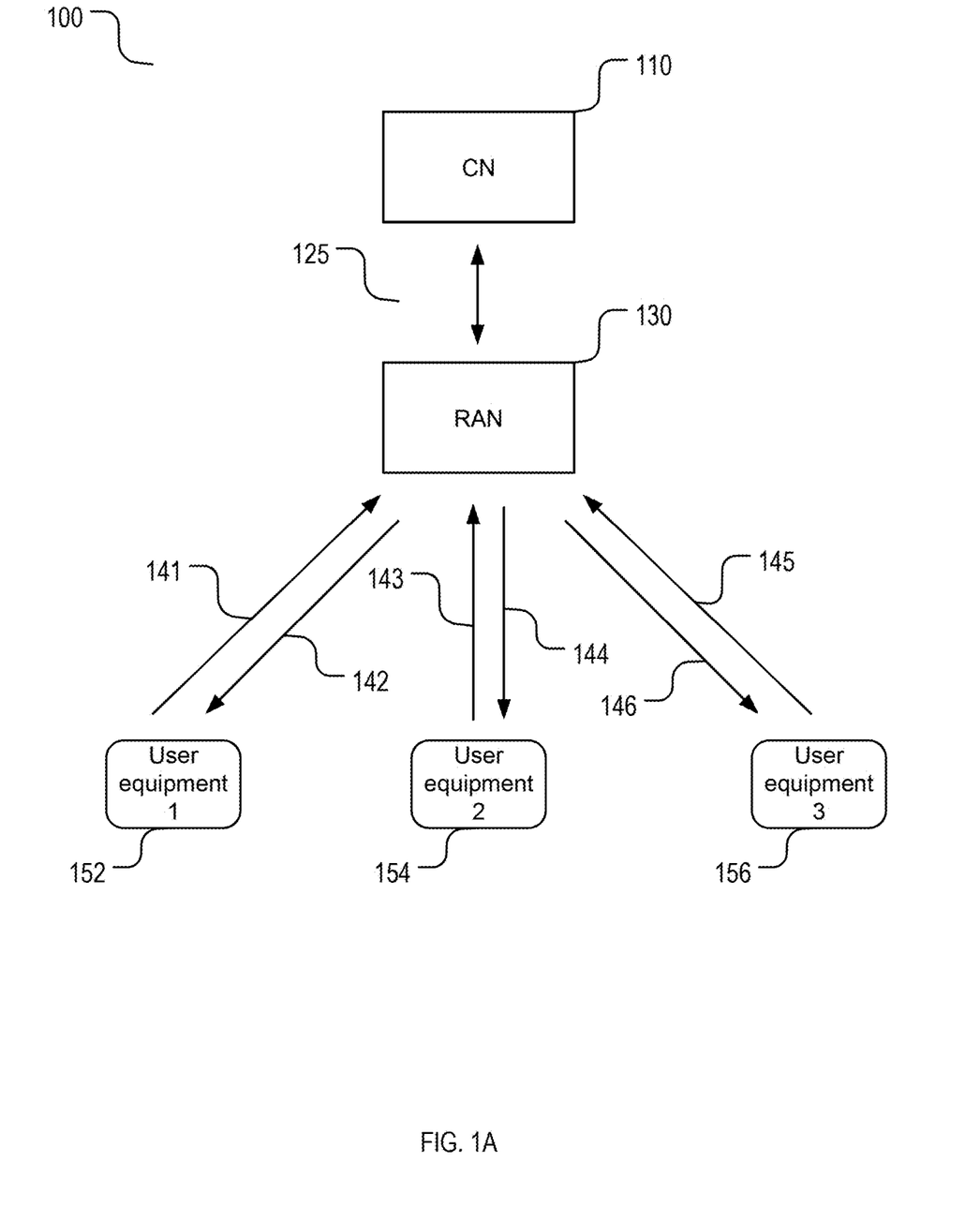
FIG. 1A shows an example of a point-to-point communication in a wireless communication system.
Figure 1B:
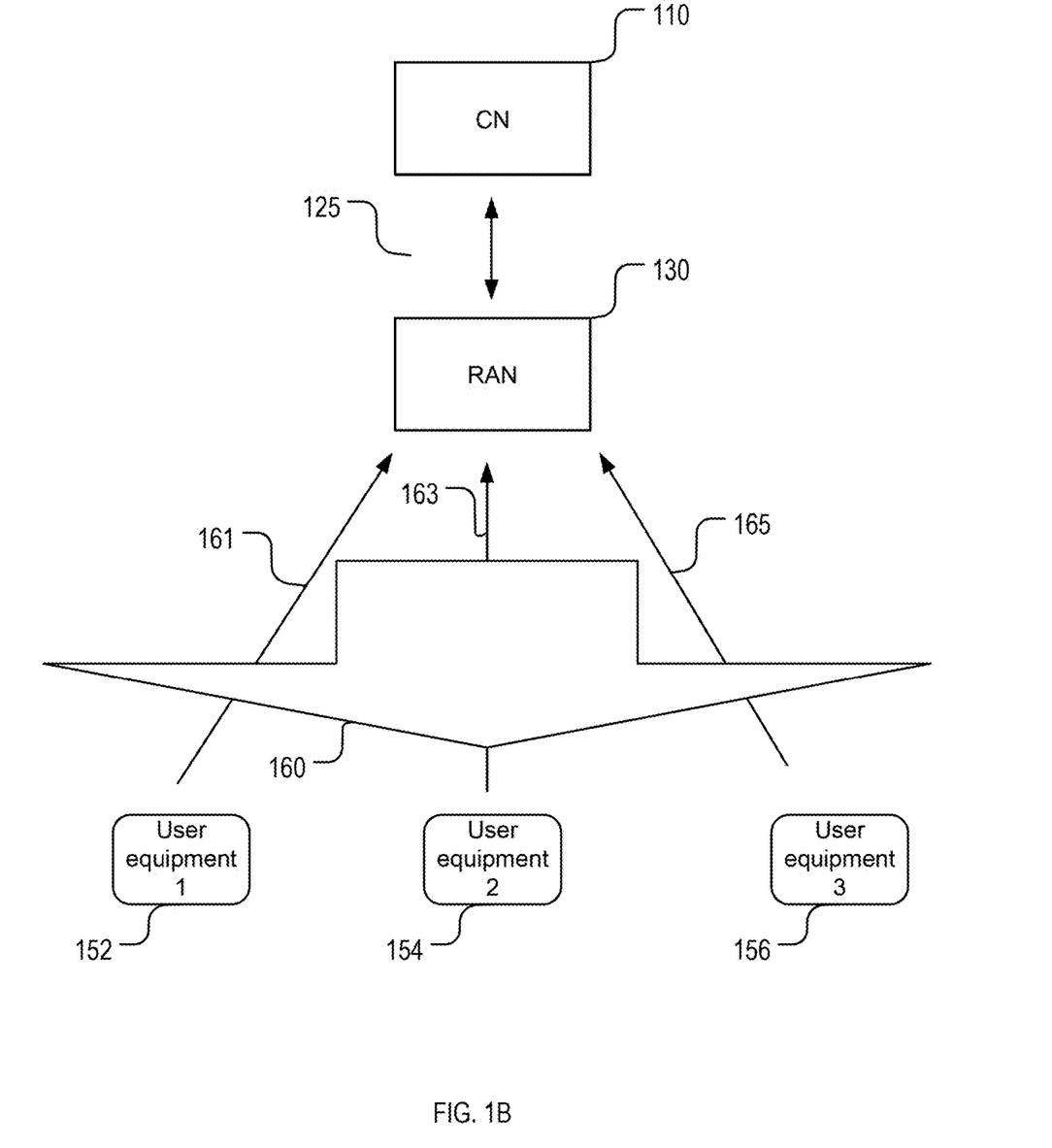
FIG. 1B shows an example of a multicast communication in a wireless communication system.

FIGS. 1A and 1B show various transmission modes for a wireless communication system 100 including a core network (CN) 110, a radio access network (RAN) 130, and one or more user equipment (UE) (152, 154, and 156). The RAN 130 may include a wireless network base station, or a NG radio access network (NG-RAN) base station or node, which may include a nodeB (NB, e.g., a gNB) in a mobile telecommunications context. In one implementation, the core network 110 may include a 5G core network (5GC), and the interface 125 may include a NG interface.

The communication between the RAN and the one or more UE may include at least a multimedia broadcast multicast (MBMS) service and/or a unicast service. UEs may receive data from the RAN via a point-to-point (PTP) or unicast service, and/or receive data from the RAN via a point-to-multipoint (PTM) or multicast or broadcast service.

Referring to FIG. 1A, a first UE 152 may wirelessly receive communication from the RAN 130 via a downlink unicast 142 and wirelessly send communication to the RAN 130 via a uplink channel 141. Likewise, a second UE 154 may wirelessly receive communicate from the RAN 130 via a downlink unicast 144 and wirelessly send communication to the RAN 130 via a uplink channel 143; and a third UE 156 may wirelessly receive communicate from the RAN 130 via a downlink unicast 146 and wirelessly send communication to the RAN 130 via a uplink channel 145.

Referring to FIG. 1B, the RAN 130 may wirelessly communicate to one or more UEs (152, 154, and 156) via a multicast traffic channel (MTCH) transmission in a MBMS service 160. In one implementation, the first UE 152 may wirelessly send communication to the RAN 130 via an uplink channel 161. Likewise, the second UE 154 may wirelessly send communication to the RAN 130 via an uplink channel 163; and the third UE 156 may wirelessly send communication to the RAN 130 via an uplink channel 165.

In the wireless communication system 100 in FIGS. 1A and 1B, the RAN 130 may send a MTCH transmission in the MBMS service to one or more UE. There may be some problems or issues, including that the UE does not provide a hybrid automatic repeat request acknowledgement/negative-acknowledgment (HARQ-ACK/NACK) information to the RAN. The HARQ-ACK information may indicate whether the MTCH transmission is correctly received by the UE. At least due to these problems and/or issues, this MTCH transmission will not be re-transmitted when the previous transmission of this MTCH was not correctly received by at least one UE. The MBMS service is a broadcast service, for example, MTCH transmission may be always transmitted to different UEs through point-to-multipoint (PTM), and these UEs may not provide uplink feedback information, such as HARQ-ACK, channel state information (CSI), etc. The uplink feedback mechanism may be complicated for one MTCH transmission, for example, it may be challenging to design the uplink feedback channel resource of MBMS service. Once a UE feeds back NACK for an MTCH transmission, it is also challenger to retransmit the MTCH for this UE. At least due to the above discussed problems and/or issues, it is challenging for using the upstream feedback information in a MBMS service.

In the wireless communication system 100, a medium access control (MAC) layer may compose MBMS service data or at least one MTCH transmission data into a data packet, and then the data packet may be transmitted to a physical layer. At the physical layer, the data packet is transmitted through a physical downlink shared channel (PDSCH) and scheduled through a physical downlink control channel (PDCCH). The decoding result of the PDSCH corresponding to the MTCH transmission data may be used as uplink feedback information, and be transmitted to the base station through the uplink feedback channel resource (corresponding to the MTCH transmission included in the PDSCH). Therefore, the uplink feedback channel resource corresponds to one MTCH transmission, that is, corresponds to one PDSCH carrying the MTCH transmission. The uplink feedback information corresponds to one MTCH transmission, that is, corresponds to one PDSCH carrying the MTCH transmission. The following description may focus on MTCH merely as an example.

The present disclosure describes various embodiments for allocating uplink resource for multimedia broadcast multicast (MBMS) uplink feedback information, addressing at least one of above discussed drawbacks and/or problems.

Figure 2:
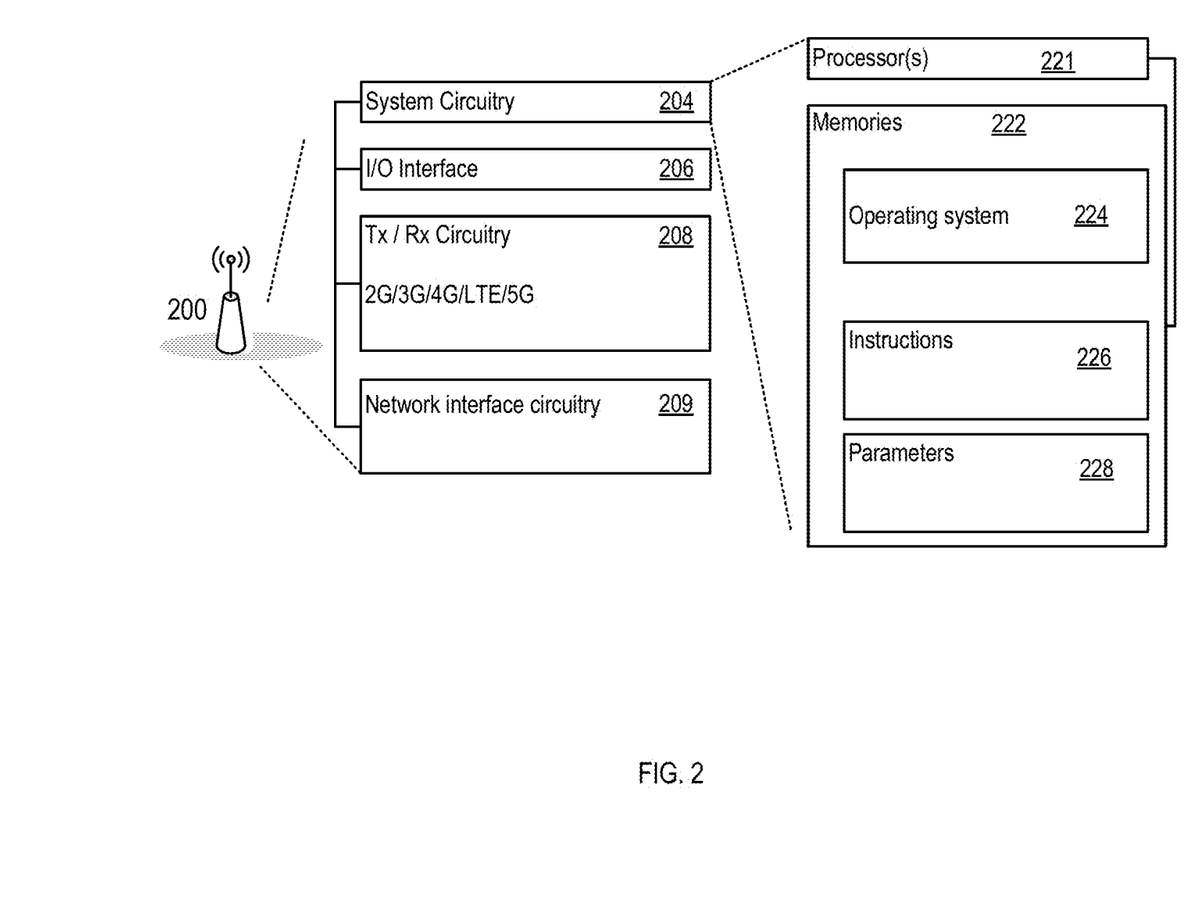
FIG. 2 shows an example of a wireless network node.

FIG. 2 shows an exemplary a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
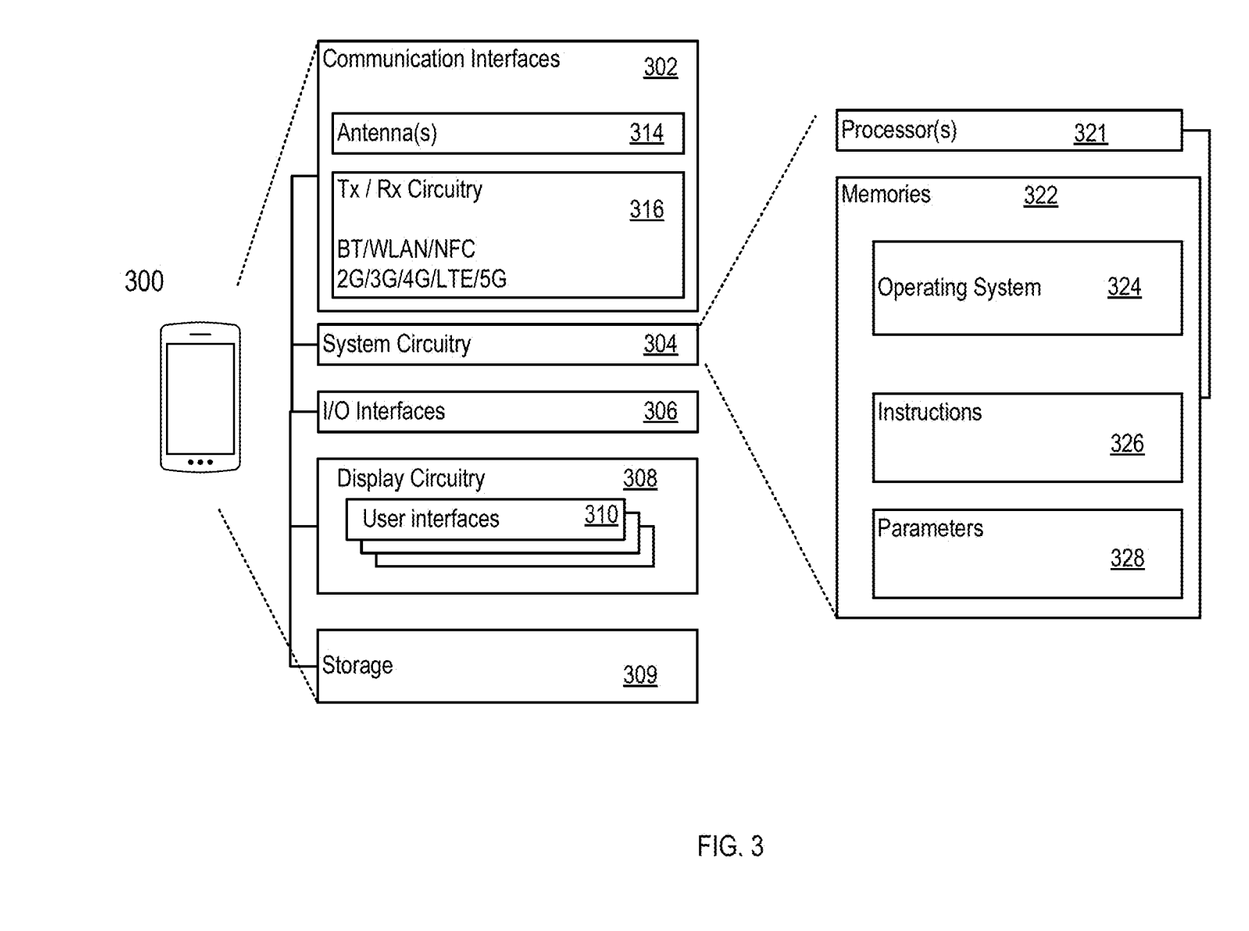
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for allocating uplink resource for multimedia broadcast multicast (MBMS) uplink feedback information, which may be implemented, partly or totally, on the wireless network base station and/or the user equipment described above in FIGS. 2 and 3.

Figure 4:
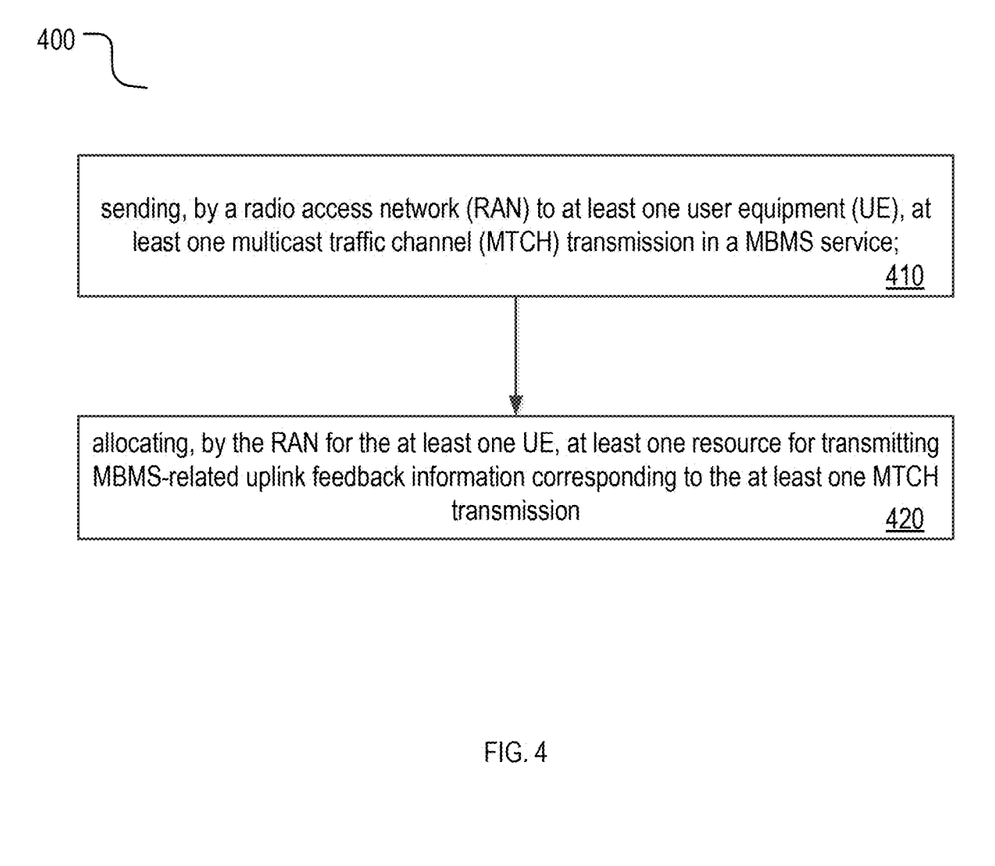
FIG. 4 shows a flow diagram of a method for wireless communication.

In various embodiments, referring to FIG. 4, a method 400 for wireless communication includes allocating uplink resource for multimedia broadcast multicast (MBMS) uplink feedback information. The method 400 may include a portion or all of the following steps: step 410, sending, by a radio access network (RAN) to at least one user equipment (UE), at least one multicast traffic channel (MTCH) transmission in a MBMS service; and step 420, allocating, by the RAN for the at least one UE, at least one resource for transmitting MBMS-related uplink feedback information corresponding to the at least one MTCH transmission.

In one embodiment, the RAN may allocate an uplink feedback channel resource for each UE of the at least one UE, and the uplink feedback channel resource is allocated for transmitting MBMS-related uplink feedback information corresponding to the each MTCH transmission. In the embodiment, for an UE corresponding to receiving an MTCH, an uplink feedback channel resource is configured for the UE receiving this MTCH. The MTCH may represent an MBMS service transmission.

In one implementation, an uplink feedback channel resource may be a physical uplink control channel (PUCCH). In the following description, the PUCCH may be used as an exemplary means for the uplink feedback channel resource.

When a UE receiving an MTCH needs to transmit uplink feedback information, the base station or the RAN may allocate a PUCCH corresponding to the MTCH to the UE, and the UE may use the allocated PUCCH. The uplink feedback information may include, for example but not limited to, hybrid automatic repeat request acknowledgement (HARQ-ACK), channel state information (CSI), and the like.

The method 400 may optionally include that, the RAN sends configuration information via a configuration message to the UE. The configuration information is for transmitting MBMS-related uplink feedback information. The configuration message may include, for example but not limited to a single cell multicast control channel (SC-MCCH) message, a radio resource control (RRC) message, or the like. Based on the configuration information, the RAN may allocate for the at least one UE, the resource for transmitting the MBMS-related uplink feedback information.

In one implementation, when one or more UEs receive a first MTCH and need to transmit uplink feedback information for a first MTCH, each UE respectively uses the PUCCH allocated to them and corresponding to the first MTCH. When some other UEs receive a second MTCH and need to transmit uplink feedback information for the second MTCH, each UEs respectively uses the PUCCH allocated to them and corresponding to the second MTCH.

In another embodiment, the RAN may allocate an uplink feedback channel resource for each MTCH transmission of one or more MTCH transmissions, and the uplink feedback channel resource is allocated for all UEs receiving the each MTCH transmission. The UE may use the allocated uplink feedback channel resource for transmitting MBMS-related uplink feedback information corresponding to the each MTCH transmission.

In one implementation, one or more UEs receive a same MTCH, and may need to transmit corresponding uplink feedback information of this MTCH. The RAN may allocate a corresponding uplink feedback channel resource for all UEs receiving this MTCH. These UEs may share the same uplink feedback channel resource for transmitting corresponding uplink feedback information of this MTCH. For example, when two UEs (UE1 and UE2) receive MTCH, and need to transmit uplink feedback information for MTCH, UE1 and UE2 use the same PUCCH resource for uplink feedback information transmission. The base station may configure the PUCCH resource per MTCH, UE1 and UE2 receiving the same MTCH may use the same uplink feedback channel resource. In this implementation, when UE1 and UE2 need to transmit feedback information, the same PUCCH resource is used for MTCH, thereby saving resources.

In another implementation, the RAN may configure uplink feedback channel resources for MTCH for UE1 and UE2, respectively. For example, when UE1 and UE2 need to transmit uplink feedback information for MTCH, UE1 and UE2 respectively use respective uplink feedback channel resources corresponding to MTCH.

In another implementation, when one or more UE share the same uplink feedback channel resource for transmitting corresponding uplink feedback information of this MTCH, the method 400 may include setting various signal strength thresholds for different number of feedback UEs. For example, a first signal strength threshold may correspond to 4 UEs sending feedback signals; and a second signal strength threshold may correspond to 8 UEs sending feedback signals. The second signal strength threshold may be larger than the first signal strength threshold since the second signal strength threshold corresponds more UEs. The RAN may sequentially obtain the number of feeding back UEs to decide whether to re-transmit the corresponding MTCH. In another implementation, the RAN may decide whether to re-transmit the corresponding MTCH according to a comparison of the received signal strength and the various signal strength thresholds.

In another embodiment, the RAN may allocate an uplink feedback channel resource for multiple MTCH transmissions, and the uplink feedback channel resource is allocated for the UE for transmitting MBMS-related uplink feedback information corresponding to the multiple MTCH transmission.

In one implementation, the RAN may allocate a same uplink feedback channel resource corresponding to multiple MTCHs. For example, multiple MTCH transmission including a first MTCH transmission (MTCH1) and a second MTCH (MTCH2) may be configured with a same uplink feedback channel resource through SC-MCCH or RRC. The RAN may configure feedback information corresponding to the first MTCH and the second MCTH to be transmitted via the same uplink feedback channel resource, saving uplink feedback channel resources. For a UE configured with the same uplink feedback channel resources for the first MTCH and the second MTCH, when the UE needs to transmit uplink feedback information for the first MTCH and/or the second MTCH, the UE may transmit the uplink feedback information in the same allocated uplink feedback channel resources.

In another embodiment, the RAN may allocate a set of uplink feedback channel resources for each MTCH transmission, and the set of uplink feedback channel resources are allocated for the one or more UE receiving the each MTCH transmission. The one or more UE may use the set of resources for transmitting MBMS-related uplink feedback information corresponding to the each MTCH transmission.

In one implementation, the RAN may configure the UE with a set of uplink feedback channel resources corresponding to one MTCH. This set may contain one or more feedback channel resources, and different uplink feedback channel resources have different maximum transmission bit numbers. The UE may determine an uplink feedback channel resource from the set of uplink feedback channel resources according to a number of transmitted bits for this UE. In another implementation, the RAN may allocate a same set of uplink feedback channel resources for multiple MTCHs to share. For example, the RAN may configure multiple MTCHs to share the same set of uplink feedback channel resources via a SC-MCCH or RRC message.

In another embodiment, the method 400 may include that the UE may use the allocated resource for transmitting uplink feedback information corresponding to at least one physical downlink control channel (PDCCH) transmission. The transmission of uplink feedback information corresponding to PDCCH may be applicable to the embodiments discussed above. For example, to determine whether the UE correctly receives a PDCCH, the RAN may configure the uplink feedback channel resource corresponding to the PDCCH for the UE. If the UE needs to transmit the uplink feedback information corresponding to the PDCCH, the UE transmits the uplink feedback information in the configured uplink feedback channel resources related to the PDCCH.

The above-mentioned way of allocating uplink feedback channel resources for MTCH transmission/MBMS service may be also fully applicable to one PDCCH. The MTCH is an exemplary channel to carry MBMS service. The PDCCH schedules a PDSCH, and the PDSCH may contain one or more MTCH transmission data, and/or MBMS service data. For example, the MTCH transmission in the above embodiment may be replaced with a PDCCH, and the uplink feedback channel resources allocated for MTCH transmission may be replaced with uplink feedback channel resources allocated for one PDCCH scheduling a PDSCH carrying the MTCH transmission. A UE may transmit the uplink feedback information related to one PDCCH through the uplink feedback channel resource corresponding to the PDCCH. For example, an uplink feedback channel resource shared by at least one UE may be allocated for NACK;

and/or an uplink feedback channel resource shared by at least one UE may be allocated for discontinuous transmission (DTX).

In one implementation, an uplink feedback channel resource may be allocated for NACK to be shared by a first UE (UE1) and a second UE (UE2), and an uplink feedback channel resource may be allocated for DTX to be shared by the UE1 and the UE2. In this way, for the UE1 and the UE2, the corresponding uplink feedback may be performed according to the actual decoding situation of the PDCCH and the PDSCH corresponding to the PDCCH as at least one of the following conditions.

For one condition, when the UE1 and/or the UE2 correctly decodes/receives the PDCCH that schedules a PDSCH carrying MTCH transmission data, but mis-decodes the PDSCH (i.e., does not correctly decode the PDSCH), the UE1 and/or the UE2 may report NACK (or send a predefined signal, such as a sequence) in the uplink feedback channel resource corresponding to NACK shared by the UE1 and the UE2;

For another condition, when the UE1 and/or the UE2 mis-decode (i.e., do not correctly decode) the PDCCH that schedules a PDSCH carrying MTCH transmission data, the UE1 and/or the UE2 may report the DTX (or send a predefined signal, such as a sequence) in the uplink feedback channel resource corresponding to DTX shared by the UE1 and the UE2;

For another condition, when the UE1 and/or the UE2 correctly decode the PDCCH that schedules a PDSCH carrying MTCH transmission data and correctly decode the PDSCH, the UE1 and/or the UE2 may send nothing on the uplink feedback channel resource corresponding to NACK and DTX shared by the UE1 and the UE2;

For another condition, when an uplink feedback channel resource is allocated for ACK to be shared by the UE1 and the UE2, and the UE1 and/or the UE2 correctly decode the PDCCH that schedules a PDSCH carrying MTCH transmission data and correctly decode the PDSCH, the UE1 and/or the UE2 may report the ACK (or send a predefined signal, such as a sequence) in the uplink feedback channel resource corresponding to ACK shared by the UE1 and the UE2.

In this way, the base station can obtain that the PDCCH is not correctly decoded by at least one UE, and thus adjust the code rate adopted by the PDCCH according to the feedback result of the UE. The UEs receive the PDCCH share uplink feedback channel resources, which is conducive to saving uplink feedback channel resources. In this way, it is equivalent to allocating two shared uplink feedback channel resources for uplink feedback information related to the PDCCH and uplink feedback information related to the PDSCH. The UE may only need to transmit corresponding uplink feedback information for the case that the PDCCH and/or PDSCH are not received correctly.

In another embodiment, a UE may use an uplink feedback channel resource of a unicast service for transmitting MBMS-related uplink feedback information corresponding to a MTCH transmission.

In one implementation, a RAN and a UE may configure to use a uplink feedback channel resources of a unicast service to transmit the uplink feedback information corresponding to the MTCH. That is, the uplink feedback information of the unicast service and the uplink feedback information of the MTCH are allowed to be multiplexed on one uplink feedback channel resource. For example, when the UE needs to transmit uplink feedback information corresponding to the received MTCH, the RAN may configure the uplink feedback channel resource corresponding to the unicast service of the UE. The UE may multiplex the uplink feedback information of the unicast service (if any) and the uplink feedback information of MTCH. The UE may transmit the multiplexed uplink feedback information in the uplink feedback channel resource of the unicast service, saving uplink feedback channel resources. In another implementation, a new RRC signaling may be used to indicate whether the UE uses uplink feedback channel resources of the unicast service to transmit the uplink feedback information of the MTCH. This embodiment may save uplink feedback channel resources and/or provide flexibility of the communication configuration.

In another embodiment, a UE may use a physical uplink shared channel (PUSCH) for a unicast service for transmitting MBMS-related uplink feedback information corresponding to a MTCH transmission. In one implementation, a RAN and a UE may configure to use a PUSCH for a unicast service to carry the uplink feedback information of a MTCH.

Figure 5:
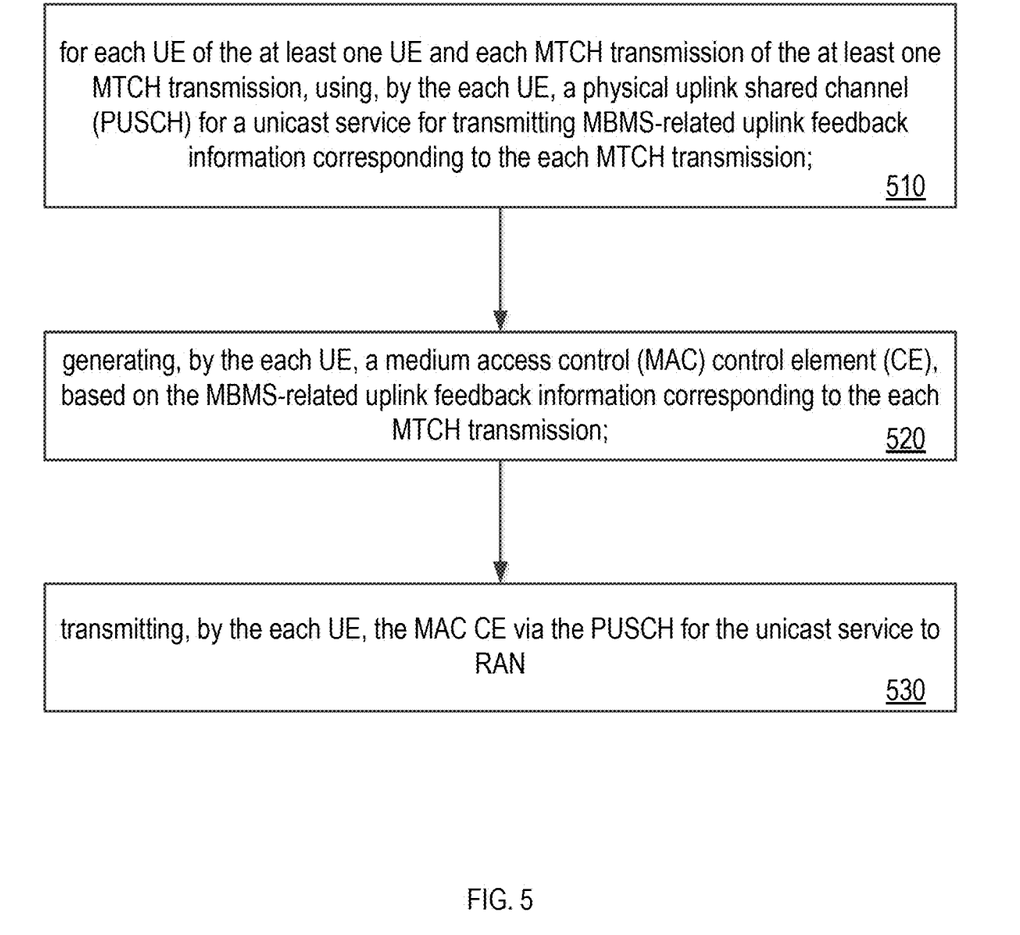
FIG. 5 shows a flow diagram of a method for wireless communication.

In one implementation referring to FIG. 5, the method 400 may further include a portion or all of the following: step 510, for each UE of the at least one UE and each MTCH transmission of the at least one MTCH transmission, using, by the each UE, a physical uplink shared channel (PUSCH) for a unicast service for transmitting MBMS-related uplink feedback information corresponding to the each MTCH transmission; step 520, generating, by the each UE, a medium access control (MAC) control element (CE), based on the MBMS-related uplink feedback information corresponding to the each MTCH transmission; and step 530, transmitting, by the each UE, the MAC CE via the PUSCH for the unicast service to RAN. In another implementation, when the MAC CE contains uplink feedback information of multiple MTCHs, the order of the uplink feedback information in the MAC CE may be configured and agreed in advance, for example but not limited to, in the order of the MTCH index, or in the order of the MTCH reception.

In another implementation, the method 400 may include transmitting, by the each UE, the MBMS-related uplink feedback information corresponding to the each MTCH transmission via the PUSCH for the unicast service to RAN. The uplink feedback information may be directly transmitted through the unicast PUSCH. Specifically, the uplink feedback information may be independently encoded, and then part of the PUSCH resources may be used to transmit the uplink feedback information accordingly. In another implementation, an occupied PUSCH resource may no longer be available for transmitting PUSCH.

Figure 6:
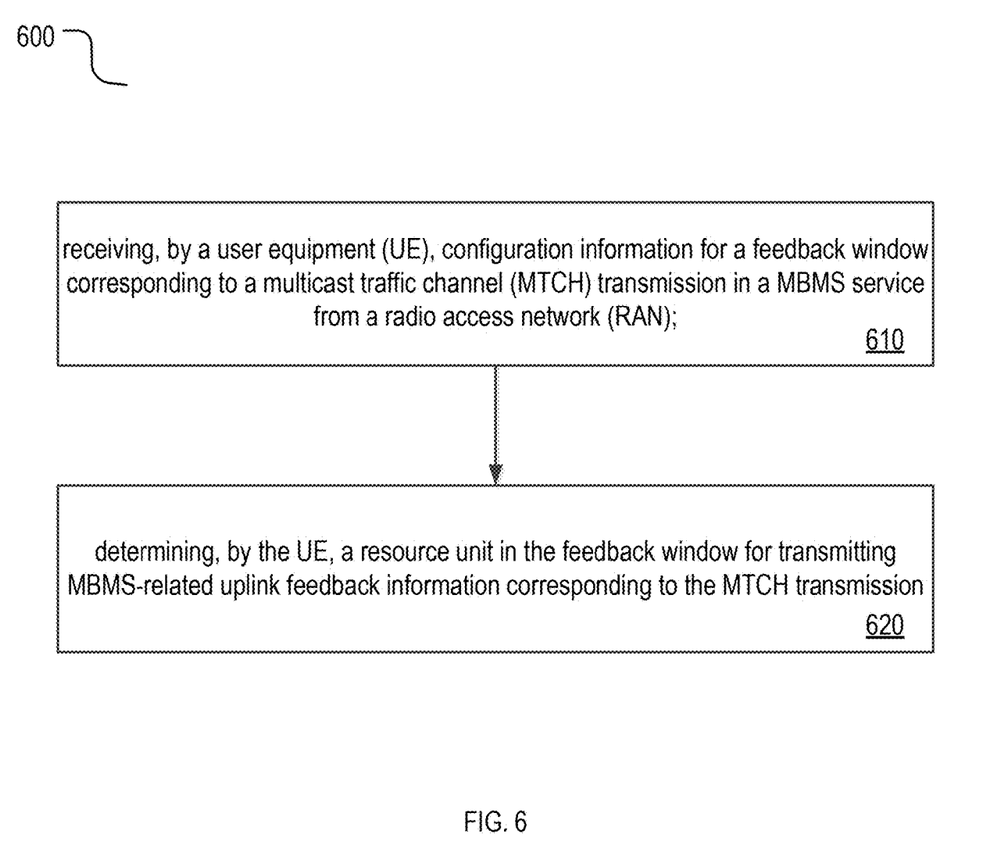
FIG. 6 shows a flow diagram of a method for wireless communication.

In various embodiments, referring to FIG. 6, a method 600 for wireless communication, including allocating uplink resource for multimedia broadcast multicast (MBMS) uplink feedback information. The method 600 may include a portion or all of the following steps: step 610, receiving, by a user equipment (UE), configuration information for a feedback window corresponding to a multicast traffic channel (MTCH) transmission in a MBMS service from a radio access network (RAN); and step 620, determining, by the UE, a resource unit in the feedback window for transmitting MBMS-related uplink feedback information corresponding to the MTCH transmission.

Figure 7:
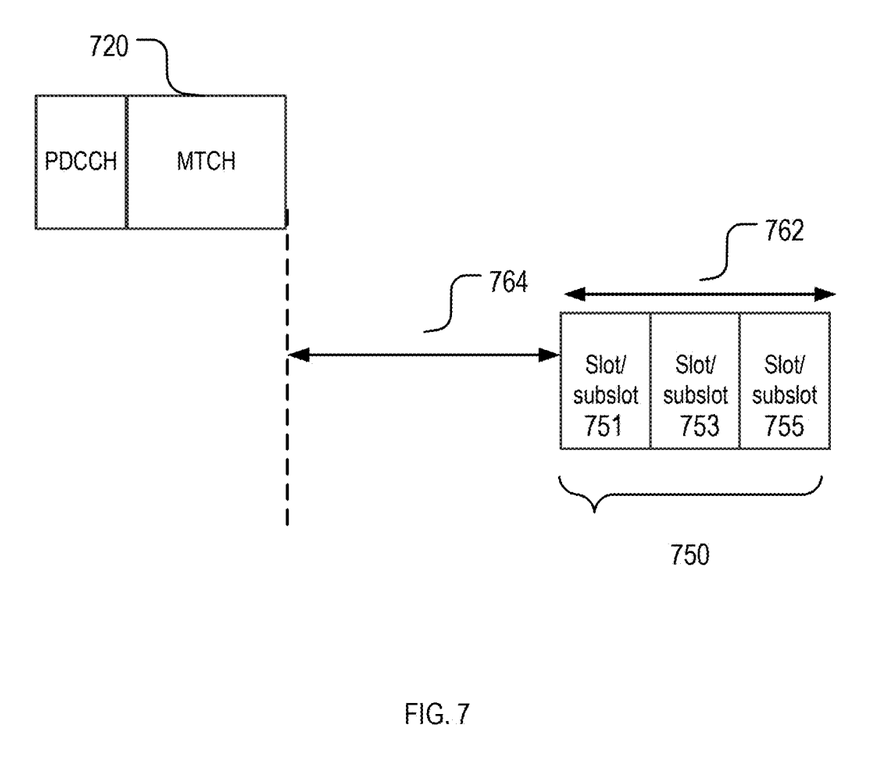
FIG. 7 shows a schematic diagram of a method for wireless communication.

In one embodiment referring to FIG. 7, a feedback window 750 may include N (762) resource units (751, 753, and 755) and a starting position (764) relative to the MTCH transmission (720). N may be a size of the feedback window, and may be any positive integer, for example but not limited to, 1, 2, 3, 4, 7, 8, 10, 20, and the like. When N=1, the feedback window includes a single resource unit. When N>1, the feedback window includes more than one resource units. In one implementation, a feedback window size for an idle UE may be larger than a feedback window size for an active UE. In FIG. 7, the feedback window 750 includes three resource units with N=3. A resource unit includes one slot/subslot.

In one implementation, the UE may receive N or the starting position of the feedback window from the RAN via at least one of the following means: a physical downlink control channel (PDCCH), a radio resource control (RRC) message, a medium access control (MAC) control element (CE), or a single cell multicast control channel (SC-MCCH). In another implementation, the RAN may notify the UE regarding feedback window size and the starting position of the feedback window separately. For example, N is configured by SC-MCCH and the start position is notified by PDCCH. For another example, N is configured by RRC and the start position is configured by SC-MCCH. In another implementation, the RAN may notify the UE regarding feedback window size and the starting position of the feedback window together.

In one embodiment, a PDCCH, which may be scrambled by an agreed common radio network temporary identifier (RNTI), schedules an MTCH, which includes a transport block. The PDCCH may indicate a starting slot/subslot of the uplink feedback information transmission corresponding to the MTCH. Together with a window size (N), a feedback window may be constructed for this MTCH to include N slots/subslots from this starting slot/subslot. In one implementation, the feedback window may include this starting slot/sublot. In another implementation, the feedback window may not include the starting slot/subslot.

The uplink feedback information corresponding to this MTCH will be transmitted in one or more slot/subslot in this feedback window. A RAN (base station) may configure the window size. In one implementation, the base station configures the value of N to the UE through PDCCH, RRC information, MAC CE, or SC-MCCH; and the base station may configure a starting slot/subslot of the feedback window to the UE by PDCCH, RRC, SC-MCCH, or MAC CE. In another implementation, N may be agreed in advance, or N may be determined based on a default value.

In one embodiment, the UE may determine which resource unit to use for transmitting the MBMS-related uplink feedback information corresponding to the MTCH transmission according to at least one of various implementations. In one implementation, the UE may determine the resource unit in the feedback window for transmitting the MBMS-related uplink feedback information corresponding to the MTCH transmission based on configuration information in a RRC message. In another implementation, the UE may determine the resource unit in the feedback window for transmitting the MBMS-related uplink feedback information corresponding to the MTCH transmission based on a random-generated value. In another implementation, the UE may determine the resource unit in the feedback window for transmitting the MBMS-related uplink feedback information corresponding to the MTCH transmission based on a value that is calculated on an radio network temporary identifier (RNTI).

Referring to FIG. 7, a UE receiving the MTCH may determine at least one specific slot/subslots in the feedback window according to the implementations discussed above. Different UEs may be dispersed in different slots/subslots in the feedback window, avoiding that multiple UEs may be concentrated in one slot/subslot for the transmission of MTCH uplink feedback information, thus mitigating tension with uplink feedback channel resources.

In another embodiment, a base station may configures a size of a feedback window corresponding to a MTCH through a SC-MCCH or RRC message. A PDCCH scrambled by a common public RNTI may schedule MTCH transmission, and one or more UE may receive the PDCCH. The UE may obtain the starting position of the feedback window from the PDCCH for the MTCH. Thus, the UE may determine the size and starting position of the feedback window for the transmission of uplink feedback information corresponding to MTCH. In one implementation, the base station may configure, via configuration information, UE's specific slot/subslot in the feedback window through SC-MCCH or RRC message. The UE may determine the specific slot/subslot in the feedback window based on the configuration information, and may transmit uplink feedback information corresponding to MTCH with the determined specific slot/subslot. In another implementation, the uplink feedback channel resource in the slot/subslot may be notified through the PDCCH, or the UE may select the corresponding uplink feedback channel resource according to the number of bits of the uplink feedback information.

Figure 8:
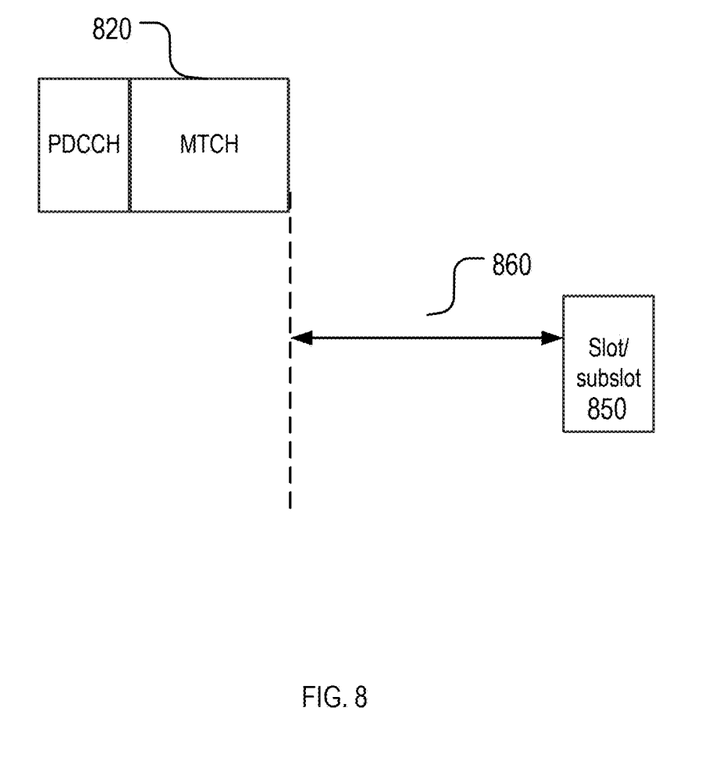
FIG. 8 shows a schematic diagram of a method for wireless communication.

In another embodiment referring to FIG. 8, a single slot/subslot 850 may be configured for transmitting uplink feedback information corresponding to a MTCH 820. The slot/subslot 850 has a starting position 860 relative to the MTCH 820. The single slot/subslot 850 may be taken as the feedback window 750 with N=1.

In one implementation, a RAN may send the configuration information to a UE via a SC-MCCH or RRC message. The configuration information may include the starting position of the single slot/subslot. The starting position of the feedback window is relative to a corresponding MTCH transmission.

In another implementation, a base station may configure an uplink feedback channel resource, and may schedule a PDCCH of MTCH to indicate a position of a slot/subslot to transmit uplink feedback information. In another implementation, the base station may configure the position of the slot/subslot to transmit uplink feedback information corresponding to MTCH through a SC-MCCH or RRC message. Referring to FIG. 8, a singe slot/subslot 850 is configured by the base station as a corresponding uplink feedback channel resource for MTCH. The slot/subslot 850 may be used for transmitting uplink feedback information corresponding to MTCH. The base station may configure the interval 860 between the slot/subslot 820 transmitted by MTCH and the slot/subslot 850 transmitted by the corresponding uplink feedback information. Thus, the UE determines the position of the slot/subslot of the uplink feedback information corresponding to MTCH.

The present disclosure describes methods, apparatus, and computer-readable medium for wireless communication. The present disclosure addressed the issues with allocating uplink resource for multimedia broadcast multicast (MBMS) uplink feedback information. The methods, devices, and computer-readable medium described in the present disclosure may facilitate the performance of wireless communication by allocating uplink resource for MBMS uplink feedback information, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
    allocating, by a radio access network (RAN), uplink resource for transmitting Multimedia Broadcast Multicast Service (MBMS) uplink feedback information, including:
        sending, by the RAN to a user equipment (UE), at least one MBMS transmission targeting a plurality of UEs; and
        configuring, by the RAN to the UE, a plurality of resources containing at least one resource for transmitting MBMS-related uplink feedback information corresponding to the at least one MBMS transmission, wherein:
            the UE determines one resource from the at least one resource based on a number of bits with respect to the MBMS-related uplink feedback information to be transmitted by the UE; and
            the UE is allowed to multiplex unicast-related uplink feedback information with the MBMS-related uplink feedback information in one uplink resource associated with the unicast transmission and transmit both the unicast-related uplink feedback information and the MBMS-related uplink feedback information as multiplexed together in the one uplink resource associated with the unicast transmission, the unicast-related uplink feedback information being generated as a feedback to a unicast transmission targeting only the UE.

2. The method according to claim 1, further comprising:
    sending, by the RAN to the UE, configuration information for transmitting the MBMS-related uplink feedback information via a configuration message,
    wherein configuring the plurality of resources for transmitting the MBMS-related uplink feedback information corresponding to the at least one MBMS transmission includes configuring, by the RAN for the UE, the plurality of resources for transmitting the MBMS-related uplink feedback information based on the configuration information.

3. The method according to claim 2, wherein:
    the configuration message comprises at least one of:
        a single cell multicast control channel (SC-MCCH) message, or
        a radio resource control (RRC) message.

4. The method according to claim 1, wherein:
    the plurality of resources for transmitting the MBMS-related uplink feedback information comprises a plurality of physical uplink control channels (PUCCHs).

5. The method according to claim 1, wherein
    the MBMS-related uplink feedback information comprises at least one of:
        a hybrid automatic repeat request acknowledgement/negative-acknowledgment (HARQ-ACK/NACK); or
        channel state information.

6. The method according to claim 1, further comprising:
    configuring, by the RAN, the plurality of resources to the UE among at least one UE; or
    configuring, by the RAN, the plurality of resources as shared by multiple UEs.

7. A method for wireless communication, comprising:
    determining, by a user equipment (UE), uplink resource for transmitting Multimedia Broadcast Multicast Service (MBMS) uplink feedback information, including:
        receiving, by the UE, at least one MBMS transmission targeting a plurality of UEs and configuration information, wherein the configuration information is used to configure a plurality of resources for transmitting MBMS-related uplink feedback information corresponding to the at least one MBMS transmission;
        determining, by the UE, one resource from the plurality of resources for transmitting MBMS-related uplink feedback information corresponding to the MBMS transmission, wherein:
            the UE determines the one resource from the plurality of resources based on a number of bits with respect to the MBMS-related uplink feedback information to be transmitted by the UE; and
            the UE is allowed to multiplex unicast-related uplink feedback information with the MBMS-related uplink feedback information in one uplink resource associated with the unicast transmission and transmit both the unicast-related uplink feedback information and the MBMS-related uplink feedback information as multiplexed together in the one uplink resource associated with the unicast transmission, the unicast-related uplink feedback information being generated as a feedback to a unicast transmission targeting only the UE.

8. The method according to claim 7, wherein:
    receiving, by the UE, the at least one MBMS transmission further comprises receiving, from a radio access network (RAN), configuration information for a feedback window corresponding to the MBMS transmission, the feedback window having N resource units and a starting position relative to the MBMS transmission, and N being a positive integer; and
    the determining by the UE, the one resource for transmitting MBMS-related uplink feedback information corresponding to the MBMS transmission further comprises determining a resource unit in the feedback window for transmitting the MBMS-related uplink feedback information corresponding to the MBMS transmission.

9. The method according to claim 8, wherein receiving the configuration information for the feedback window corresponding to the MBMS transmission from the RAN comprises:
receiving N or the starting position from the RAN via at least one of:
a physical downlink control channel (PDCCH),
a radio resource control (RRC) message,
a medium access control (MAC) control element (CE), or
a single cell multicast control channel (SC-MCCH).

10. The method according to claim 8, wherein determining the resource unit in the feedback window for transmitting the MBMS-related uplink feedback information corresponding to the MBMS transmission comprises:
determining, by the UE, the resource unit in the feedback window for transmitting the MBMS-related uplink feedback information corresponding to the MBMS transmission based on a random-generated value.

11. The method according to claim 8, wherein determining the resource unit in the feedback window for transmitting the MBMS-related uplink feedback information corresponding to the MBMS transmission comprises:
determining, by the UE, the resource unit in the feedback window for transmitting the MBMS-related uplink feedback information corresponding to the MBMS transmission based on a value that is calculated on a radio network temporary identifier (RNTI).

12. A User Equipment (UE) comprising:
a memory storing instructions; and
a processor in communication with the memory, wherein, when the processor executes the instructions, the processor is configured to cause the UE to perform:
determining uplink resource for Multimedia Broadcast Multicast Service (MBMS) uplink feedback information, including:
receiving at least one MBMS transmission targeting a plurality of UEs and a plurality of resources for transmitting MBMS-related uplink feedback information corresponding to the at least one MBMS transmission; and
determining one resource from the plurality of resources for transmitting MBMS-related uplink feedback information corresponding to the MBMS transmission, wherein:
the UE determines the one resource from the plurality of resources based on a number of bits with respect to the MBMS-related uplink feedback information to be transmitted by the UE; and
the UE is allowed to multiplex unicast-related uplink feedback information with the MBMS-related uplink feedback information in one uplink resource associated with the unicast transmission and transmit by both the unicast-related uplink feedback information and the MBMS-related uplink feedback information as multiplexed together in the one uplink resource associated with the unicast transmission, the unicast-related uplink feedback information being generated as a feedback to a unicast transmission targeting only the UE.

13. The UE according to claim 12, wherein:
receiving the at least one MBMS transmission further comprises receiving, from a radio access network (RAN), configuration information for a feedback window corresponding to the MBMS transmission, the feedback window having N resource units and a starting position relative to the MBMS transmission, and N being a positive integer; and
determining the one resource for transmitting MBMS-related uplink feedback information corresponding to the MBMS transmission further comprises determining a resource unit in the feedback window for transmitting the MBMS-related uplink feedback information corresponding to the MBMS transmission.

14. The UE according to claim 13, wherein, when the processor is configured to further cause the UE to perform receiving the configuration information for the feedback window corresponding to the MBMS transmission from the RAN, the processor is configured to cause the UE to perform:
receiving N or the starting position from the RAN via at least one of:
a physical downlink control channel (PDCCH),
a radio resource control (RRC) message,
a medium access control (MAC) control element (CE), or
a single cell multicast control channel (SC-MCCH).

15. The UE according to claim 13, wherein, when the processor is configured to further cause the UE to perform determining the resource unit in the feedback window for transmitting the MBMS-related uplink feedback information corresponding to the MBMS transmission, the processor is configured to cause the UE to perform:
determining the resource unit in the feedback window for transmitting the MBMS-related uplink feedback information corresponding to the MBMS transmission based on a random-generated value.

16. The UE according to claim 13, wherein, when the processor is configured to further cause the UE to perform determining the resource unit in the feedback window for transmitting the MBMS-related uplink feedback information corresponding to the MBMS transmission, the processor is configured to cause the UE to perform:
determining the resource unit in the feedback window for transmitting the MBMS-related uplink feedback information corresponding to the MBMS transmission based on a value that is calculated on a radio network temporary identifier (RNTI).

* * * * *